May 9, 1967

J. C. SIEGLE ETAL 3,318,729

TUBULAR WELDING ROD HAVING A CHLORINE OR FLUORINE
SUBSTITUTED ETHYLENICALLY UNSATURATED
ALIPHATIC HYDROCARBON POLYMER CORE

Filed Aug. 5, 1965

INVENTORS
JOHN C. SIEGLE
JOHN TETI, SR.

BY *Norbert F. Reinert*

ATTORNEY

United States Patent Office 3,318,729
Patented May 9, 1967

3,318,729
TUBULAR WELDING ROD HAVING A CHLORINE OR FLUORINE SUBSTITUTED ETHYLENICALLY UNSATURATED ALIPHATIC HYDROCARBON POLYMER CORE
John C. Siegle and John Teti, Sr., Wilmington, Del., assignors to E. I. du Pont de Nemours and Company, Wilmington, Del., a corporation of Delaware
Filed Aug. 5, 1965, Ser. No. 477,401
8 Claims. (Cl. 117—202)

This is a continuation-in-part of our copending application U.S. Ser. No. 143,090, filed Oct. 5, 1961, and now abandoned.

This invention relates to welding rods. It is directed to a welding rod comprising a metal tube having an inner core comprising at least one solid halogenated hydrocarbon polymer. The core may be in the form of a filament or it may be finely divided particulate material.

According to this invention it has been found that the use of welding rods having an inner core containing solid halogenated hydrocarbon polymer produces welds which are free from the effects of oxidation and also substantially free of inclusions and occlusions. This effect is attributable to the decomposition of the polymer at welding temperatures to form gaseous products. These decomposition products apparently react with and effectively tieup the oxygen in the atmosphere immediately surrounding the weld site, thereby inhibiting interaction between the oxygen and the molten metal. In addition it has been found that these welding rods give better puddling, less undercutting, better penetration and better arc control than has heretofore been possible with conventional rods.

Figure 1:
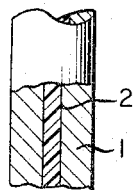
FIGURE 1 represents a cross-section of a tubular welding rod 1 according to this invention having an inner core 2 comprising a filament of a solid halogenated hydrocarbon polymer.
Figure 2:
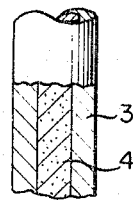
FIGURE 2 represents a cross-section of a tubular welding rod 3 according to this invention having an inner core 4 comprising a solid finely divided particulate halogenated hydrocarbon polymer.
Figure 3:
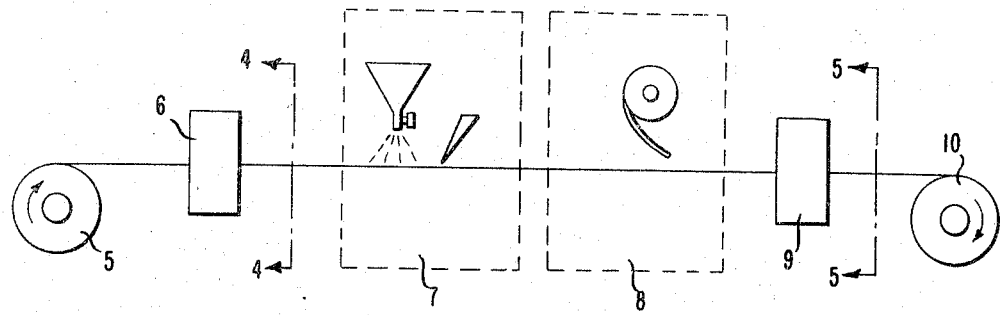
FIGURE 3 is a schematic design of a continuous process for manufacturing both granular flux and filament-cored tubing rods.

In the process depicted in FIGURE 3, the rod starts as a thin flat metal strip fed from a roll 5. To make a typical rod ⁹⁄₃₂ inch O.D., for example, suitable strip dimensions would be ⁵⁄₁₆ inch wide and ¹⁄₆₄ inch thick. The lead of the strip is precut to a point for ease of starting through die openings.

In the first die-forming stage 6, the strip is preformed into a U or trough shape. This may be done by roll-forming using a roller-die combination as illustrated in FIGURE 4.

The U-shaped strip is then supplied with solid, finely divided particulate halogenated hydrocarbon polymer through a hopper arrangement and the level of the particulate polymer controlled with a following doctor blade. This arrangement is indicated generally by the numeral 7 in FIGURE 3. Alternatively, a filament core material can be fed from a roll directly into the shaped strip using an arrangement depicted generally by the numeral 8 in FIGURE 3. In this case, of course, there is no need for level control.

Figure 5:
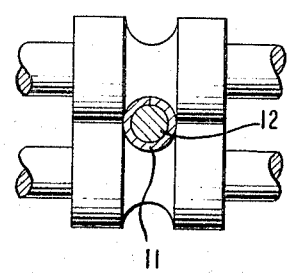
FIGURE 5 is a representation of the roller-die combination of the second die-forming stage of the process depicted in FIGURE 3.

After insertion of the core material the strip proceeds through a die or die series, as illustrated at 9 in FIGURE 3 and by the roller combination in FIGURE 5. There the strip is closed tightly into a tube with overlapped seam. The finished core electrode is wound on a spool, as indicated at 10 in FIGURE 3, or trimmed to desired lengths to provide stick welding rods for manual work.

Figure 4:
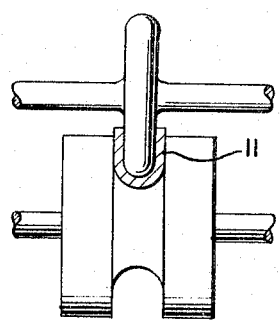
FIGURE 4 is a representation of the roller-die combination of the first die-forming stage of the process depicted in FIGURE 3.

In FIGURE 4, the numeral 11 represents a cross-section of the metal strip in the U-formed stage and in FIGURE 5 the numeral 11 represents the same strip after it has been formed into a tube. The numeral 12 in FIGURE 5 indicates the inner core of the tube containing a halogenated hydrocarbon polymer.

Throughout the forming stages of the process depicted, the roll dies are power-driven and the entire process is mechanized and continuous. For limited production of course a single rod, say 12 inches long, can be made manually by drawing a strip through a series of die block openings, with flux or filament being supplied at the U-formed stage.

The metal portion of the welding rod can take more complex shapes than a simple elongated hollow cylinder. For example, the rod can have internal folds of metal which hold the granular polymer core material in place. Similar tubular wire having a core of conventional granular flux material is presently available commercially from the Arcos Corporation, Philadelphia, Pa.

The term "welding rod" as used herein is intended to embrace not only stick electrodes as used in manual arc welding, but also coiled wire electrodes as used in automatic and semiautomatic arc welding, and stick and coiled-wire filler materials as used in gas welding, resistance welding, and arc welding with a non-consumable tungsten electrode.

The polymer used as a core material for the welding rods of this invention can be any of the common halogenated hydrocarbon polymers or telomers. The polymer should be one which is solid at normal ambient temperatures. The hydrocarbon monomers which make up the polymer system may be substituted by either chlorine or fluorine or both. Since the polymers are decomposed on contact with the molten metal, neither the carbon length in the polymer unit nor the degree of polymerization is in any way critical.

Ordinarily the polymers used will be homopolymers of ethylenically unsaturated aliphatic hydrocarbon monomers containing 2 to about 10 carbon atoms, each monomer being substituted by at least one atom selected from the group consisting of chlorine and fluorine. There can also be used interpolymers of said monomers with each other and interpolymers of said monomers with ethylenically unsaturated aliphatic hydrocarbon monomers containing 2 to about 10 carbon atoms. Mixtures of polymers can also be used.

The preferred polymers used according to this invention are the commonly-known fluorinated hydrocarbon polymers or telomers. These include, for example, polychlorotrifluoroethylene, polyvinylidene fluoride, polyvinyl fluoride, the fluorocarbon polymers such as polytetrafluoroethylene and polyhexafluoropropylene, and copolymers such as the copolymers of vinylidene fluoride and tetrafluoroethylene with hexafluoropropylene. Of these polymers, polytetrafluoroethylene is preferred because of its effectiveness.

As indicated above, the polymer core may be in the form of a filament or it may be particulate. Filaments of halogenated hydrocarbon polymers are of course made by conventional methods. If the polymer is a low temperature fusible one, such as polyvinyl chloride, for example, it may be melt extruded. If the polymer fuses at very high temperatures, it may be more convenient to incorporate it into a flament in particulate form. For example, particulate polytetrafluoroethylene can be added to a melt of polyvinyl chloride or other low temperature fusible resin such as polyvinyl alcohols, polyvinyl acetate, and polyethylene. The mixture can be then melt extruded to form a filament in which the low temperature fusible polymer comprises the matrix. Alternatively, the particulate high-melting polymer can be mixed with conventional binders such as natural gums, e.g. gum arabic and gum tragacanth, methyl celluloses, or sodium or potassium silicates, water or other liquid added to make a paste. The mixture can then be paste extruded to form a filament and the filament can be heated to a high temperature, e.g. 200–500° C., depending upon the polymer, to sinter the polymer particles. All of these filament-forming techniques are so familiar to those skilled in the art as to require no extended discussion. Particulate halogenated hydrocarbon polymers are made principally by polymerization in aqueous medium. As is well known, the conditions of the polymerization determine the size of the polymer particles which may range from colloidal up to a millimeter or more. Colloidal dispersions, of course, may be coagulated to form relatively large particles which are actually agglomerates of much smaller particles. Relatively large polymer particles can be subjected to water cutting, air cutting, hammer milling, and similar conventional methods of mechanical subdivision to provide particles of virtually any desired size. Reference can be had, for example, to U.S. Patents 2,393,967, 2,936,301, 2,559,752, and 2,593,583 for details of procedure for making particulate halogenated hydrocarbon polymers. Since such procedures are well-known to those skilled in the art the details need not be recited here.

It is to be observed that particulate polymer materials which are entirely suitable for use in the welding rods of this invention can also be obtained by applying the usual methods of mechanical subdivision, e.g. hammer milling, to scrap material resulting from manufacturing processes involving molding and sintering of virgin particulate polymer.

The particle size of the polymer is not critical. In general, particles having average dimensions between about 0.05 and 2.0 mm. will be used, but smaller particles down to about 1 micron and larger particles up to 3 mm. or more can be used.

The metal tubing portion of the welding rods can be virtually any ferrous or non-ferrous metal or alloy. Thus, it may be steel or a ferrous alloy such as nickel-iron, nickel-chromium-iron, or nickel-molybdenum-iron, or it may be a non-ferrous metal or alloy such as bronze or aluminum-bronze.

It is to be observed that the welding rods of this invention will ordinarily also include various conventional weld-modifying agents in addition to the halogenated hydrocarbon polymer core. For example, a fluxing agent will ordinarily be used. The flux materials are commercially available solid granular substances usually consisting of one or more of the oxides of such metals as calcium, potassium, sodium, silicon, aluminum, titanium, magnesium, zirconium and manganese. The oxides may be present as such or as compounds, for example, as carbonates, silicates, aluminates, and the like. The commercially available flux materials may also contain minor amounts of various additives for specific purposes, or the additives may be included separately. Halide salts such as calcium fluoride, sodium fluoride and the like may be included to increase the fluidity of the weld metal. A killing agent or deoxidizer such as manganese, silico-manganese, ferro-manganese, ferro-silicon, titanium or ferro-titanium can also be included. If desired, an alloying metal can also be present, either as the metal itself or as a reducible compound of the metal in combination with a reducing agent.

These weld-modifying agents may be incorporated into the welding rods of this invention in any conventional manner. Normally, they are mixed in solid granular form with a binding agent such as sodium silicate or a thermoplastic resin and applied as a coating to the rod by brushing, dipping, spraying, or extrusion techniques. The details of these procedures are so well-known as to require no extended discussion.

If desired, a topcoat of a film-forming agent which serves as a dielectric for better arc control, and a moisture barrier can be applied to the rods. For example, sodium or potassium silicate or, preferably, an organic resin such as polytetrafluoroethylene, polyvinyl chloride, epoxy resins, and polyethylene can be applied to the outer surface of a bare or flux-coated rod. Also, if desired, a flux-coated rod can be coated with a layer of metal using conventional molten metal spraying techniques in order to provide a rod which is resistant to physical damage and can withstand rough handling.

It is to be observed that a highly preferred mode of incorporating weld-modifying substances of the type described above into a welding rod is to combine them in granular form with the halogenated hydrocarbon polymer in the core. The substance may be combined with particulate polymer by simple physical admixture, or the finely divided materials blended as by tumbling in the presence of a binding agent such as sodium silicate or carboxymethyl cellulose or the like to provide agglomerates made up of smaller particles of polymer and weld-modifying substance.

The granular weld-modifying substances of course can also be incorporated into a filament which is to form the core. Thus, for example, if the halogenated hydrocarbon polymer is one which is fusible at low temperatures, the granular weld-modifying substances can be mixed with the molten polymer and the melt can be extruded. Alternatively the granular weld-modifying substances and a particulate high temperature fusible halogenated hydrocarbon polymer such as polytetrafluoroethylene can be dispersed in a molten low temperature polymer such as polyvinyl chloride or the like and the mixture can be melt extruded to provide a filament. As a further alternative, granular weld-modifying substances can be mixed with particulate halogenated hydrocarbon polymer and conventional binders and water or other liquid to form a paste. The mixture can then be paste-extruded to form a filament and, if desired, the filament can then be heated to sinter the halogenated polymer particles.

As a still further alternative for forming a core material, a tube composed of a resinous material such as polyethylene or a cellulosic material such as paper can be filled with particulate halogenated hydrocarbon polymer or a combination of the particulate polymer and weld-modifying substances to provide a filament.

Again, the various techniques of forming filaments are so well known as to require no detailed description for an understanding of the invention.

Regardless of how the materials are combined, they may then be introduced into the rods, for example, in the U-formed stage in the process illustrated in FIGURE 3 of the drawings to provide the core.

Ordinarily the welding rods of this invention will range from .045" to 5/16" O.D. More frequently, the rods will range between 1/16" and 1/4" O.D. and between 0.01" and 7/32" I.D.

The ratio by weight of halogenated hydrocarbon polymer to metal in the rod can vary widely but will ordinarily be between about 1:100 and 1:4. The approximate ratio 1:4 represents a case where the core material is solely halogenated hydrocarbon polymer. Lower ratios than 1:100 of course can be used but the benefits are marginal. In fact a ratio of polymer to metal of at least about 1:20 is preferred.

Where a granular flux material is combined with halogenated hydrocarbon polymer to form a core material, they will ordinarily be used in proportions ranging from 1:0.04 to 1:100 parts of polymer per part by weight of flux. The preferred range of proportions is 1:1 to 1:20.

The invention will be further described by the following illustrative examples:

Example 1

A hollow mild steel welding rod 3/16 of an inch thick is filled with a filament of polytetrafluoroethylene polymer 70 mils thick so that the filament fits snugly into the hollow space. The rod is then drawn through a die so that its diameter is reduced by about 2 mils to provide a snug fit. The rod is used to weld mild steel by feeding the rod to the weld area heated with an oxyacetylene flame. The rod gives good puddling, little undercutting and gives good penetration.

Examples 2–6

The procedure of Example 1 is followed except that 70 mil thick filaments of the following polymers are substituted for the polytetrafluoroethylene filament with substantially equivalent results.

Example 2: polyvinyl chloride
Example 3: polyhexafluoropropylene
Example 4: polyvinylidene fluoride
Example 5: polychlorotrifluoroethylene
Example 6: copolymer of vinylidene fluoride and tetrafluoroethylene

Example 7

(1) Equal parts by weight of a particulate polytetrafluoroethylene and a granular flux material containing titania, lime, magnesia, alumina, silica, calcium fluoride, and, as a deoxidizer ferro-titanium, are weighed out. Two parts by weight of the mixture are placed in a tumbler with ½ part by weight of a commercial aqueous solution of sodium silicate (41° Bé, ca. 38% solids, $SiO_2:Na_2O$ 3.2:1). The tumbler is rotated slowly for one hour during which time the particles of polymer and flux are agglomerated into larger particles. The particulate material is removed from the tumbler and air dried.

The polytetrafluoroethylene used consists of spheroidal particles ranging in size from about 300 to 600 microns, with an average size of about 500 microns, prepared by coagulating an aqueous colloidal dispersion of the polymer. The particles are thus agglomerates of much smaller particles.

(2) The lead end of a spool of mild steel strip 5/16" wide and 1/64" thick is fed into a roller die combination as shown in FIGURE 4 of the drawings where it is formed into the shape of a U. The U-formed strip then passes under a hopper where it is charged with 0.0026# of the granular material prepared as described in paragraph 1 above per linear foot of strip, which is equivalent to about 0.16# of the core material per pound of metal in the strip. The particulate core material is leveled by a doctor blade following the hopper. The strip is then fed into a roller-die combination as depicted in FIGURE 5 of the drawings where it is formed into a tube having an O.D. of 3/32" and an I.D. of 1/16". Finally the cored-tube is wound onto a take-up spool and is ready for use either as an electrode in arc welding operations or as a filler wire in gas or resistance welding or in arc welding using a tungsten electrode.

Example 8

(1) One part by weight of a particulate polyhexafluoropropylene (average particle size of about 300 microns, obtained by grinding in a hammer mill the virgin polymer) is blended in a tumbler with 4 parts by weight of a granular flux material of the type used in Example 7.

(2) One part by weight of the mixture thus prepared is dispersed in 2 parts by weight of molten polyvinyl chloride plasticized with tricresyl phosphate and the resulting mixture is melt extruded to form a filament 65 mils in diameter. The filament is wound onto a spool.

(3) The lead end of a spool of mild steel strip 5/16" wide and 1/64" thick is fed into a roller-die as shown in FIGURE 4 of the drawings. The filament prepared as described in paragraph 2 is then fed from a spool into the U-formed strip and the strip then passes through a second roller die as shown in FIGURE 5 of the drawings where it is formed into a tube having an O.D. of 3/32" and an I.D. of 1/16". The tube is then wound onto a take-up spool as indicated by the numeral 10—in FIGURE 3 of the drawing. The spooled wire can be used as such as an electrode or filler wire in automatic and semiautomatic welding processes or it can be cut into lengths of about 12" to provide stick electrodes and filler wires for manual work.

Example 9

One part by weight of the particulate polytetrafluoroethylene used in Example 7 is dispersed in 2 parts molten polyethylene and the mixture is extruded to form a filament 65 mils in diameter. This filament is used to form the core of a 3/32" O.D.–1/16" I.D. mild steel tube using the procedure described in Example 8. The ratio by weight of polytetrafluoroethylene to metal in the resulting wire is approximately 1:20. A 12" length of this wire is cut and coated with a commercial granular flux material. When used as an electrode in the arc welding of a mild steel plate, this wire provides a weld which is substantially free from the effects of oxidation.

The invention claimed is:

1. As a welding rod, a metal tube having a core comprising at least one solid polymer of ethylenically unsaturated aliphatic hydrocarbon monomers containing 2 to about 10 carbon atoms, each monomer being substituted by at least one atom selected from the group consisting of chlorine and fluorine.

2. The welding rod of claim 1 wherein the polymer is in the form of a filament.

3. The welding rod of claim 1 wherein the polymer is in finely divided particulate form.

4. The welding rod of claim 1 wherein the polymer is selected from the group consisting of polychlorotrifluoroethylene, polyvinylidene fluoride, polyvinyl fluoride, polytetrafluoroethylene, polyhexafluoropropylene, copolymer of vinylidene fluoride and tetrafluoroethylene with hexafluoropropylene and mixtures thereof.

5. As a welding rod, a metal tube having a core comprising at least one solid polymer of ethylenically unsaturated aliphatic hydrocarbon monomers containing 2 to about 10 carbon atoms, each monomer being substituted by at least one atom selected from the group consisting of chlorine and fluorine and a granular flux material.

6. As a welding rod, a metal tube having as a core a filament comprising polytetrafluoroethylene and a granular flux material.

7. As a welding rod, a metal tube having a core comprising finely divided particulate polytetrafluoroethylene and a granular flux material.

8. As a welding rod, a metal tube haivng a core containing a granular material composed of agglomerates of finely divided fluorocarbon polymer particles and particles of a granular flux material held together by a binder.

References Cited by the Examiner

UNITED STATES PATENTS

| | | | |
|---|---|---|---|
| 2,421,594 | 6/1947 | Boot | 117—202 X |
| 2,875,104 | 2/1959 | Bergh et al. | 117—207 X |
| 3,118,760 | 1/1964 | Avery et al. | 117—207 |

FOREIGN PATENTS

| | | |
|---|---|---|
| 2,109/59 | 5/1959 | Japan. |

ALFRED L. LEAVITT, *Primary Examiner.*

WILLIAM L. JARVIS, *Examiner.*